US011774262B1

(12) United States Patent
Lyle et al.

(10) Patent No.: US 11,774,262 B1
(45) Date of Patent: *Oct. 3, 2023

(54) SYSTEMS AND METHODS FOR TRANSPORTATION MANAGEMENT

(71) Applicant: UNITED SERVICES AUTOMOBILE ASSOCIATION (USAA), San Antonio, TX (US)

(72) Inventors: Ruthie Lyle, Durham, NC (US); Jason W. Lindley, Schertz, TX (US); Bradly Jay Billman, Pocatello, ID (US)

(73) Assignee: United Services Automobile Association (USAA), San Antonio, TX (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/315,839

(22) Filed: May 10, 2021

Related U.S. Application Data

(63) Continuation of application No. 16/144,749, filed on Sep. 27, 2018, now Pat. No. 11,015,952.

(60) Provisional application No. 62/564,106, filed on Sep. 27, 2017.

(51) Int. Cl.
G01C 21/00 (2006.01)
G01C 21/36 (2006.01)
G01C 21/34 (2006.01)

(52) U.S. Cl.
CPC ..... *G01C 21/3676* (2013.01); *G01C 21/3415* (2013.01); *G01C 21/3469* (2013.01); *G01C 21/3492* (2013.01); *G01C 21/367* (2013.01)

(58) Field of Classification Search
None
See application file for complete search history.

(56) References Cited

U.S. PATENT DOCUMENTS

| | | | |
|---|---|---|---|
| 2015/0369620 A1* | 12/2015 | Kim | G09B 29/007 701/521 |
| 2018/0058868 A1* | 3/2018 | Kang | B60W 20/12 |
| 2018/0094943 A1* | 4/2018 | Grochocki, Jr. | G01C 21/3492 |
| 2019/0301891 A1 | 10/2019 | Rowitch | |
| 2020/0011692 A1 | 1/2020 | Sun et al. | |

* cited by examiner

*Primary Examiner* — James M McPherson
(74) *Attorney, Agent, or Firm* — Fletcher Yoder, P.C.

(57) ABSTRACT

Systems and methods for transportation management described herein are capable of providing a recommendation to a user on a mode of transportation to travel from a start location to a destination location. The systems and methods may the determine a recommended mode of transportation based on user preferences obtained from a user profile and energy cost associated with each of available modes of transportation to travel from the start location to the destination location. The systems and methods then transmits a recommended mode of transportation along with a recommended route to travel from the start location to the destination location on a graphical user interface of a user device of the user.

20 Claims, 4 Drawing Sheets

SYSTEMS AND METHODS FOR TRANSPORTATION MANAGEMENT

CROSS REFERENCES TO RELATED APPLICATIONS

This application is a continuation of U.S. patent application Ser. No. 16/144,749 filed Sep. 27, 2018, which claims the benefit of U.S. Provisional Application No. 62/564,106, filed Sep. 27, 2017, which are hereby incorporated by reference in their entirety.

TECHNICAL FIELD

This application relates generally to systems, apparatus, and methods for transportation management, and in particular relates to dynamically updating graphical user interfaces displaying different modes of transportation.

BACKGROUND

Global Positioning System (GPS) based navigation devices and/or applications are well known, and are widely employed by users. Common functions of a navigation device and/or a navigation application include providing a map database for generating navigation instructions that are shown on a display of the navigation device and/or application. Such navigation devices are typically mounted on a dashboard of a vehicle or maybe such navigation applications are installed on a user mobile computing device. A user may employ these navigation applications and/or devices to get route and transportation options to get from one location to another location. However, there is no technique currently available in known navigation applications and/or devices to provide a recommendation on a mode of transportation and other navigation related information to travel from one geographic location to another geographic location based on energy efficiency of the transportation mode that could be dynamically updated on graphical user interfaces based on varying conditions in real time.

SUMMARY

There is a desire for a transportation management system that recommends and dynamically updates graphical user interfaces with different modes of transportation to travel from one geographic location to another geographic location based on energy efficiency of each transportation mode. The transportation management system includes a server for dynamically updating a graphical user interface of a user device with multiple modes of transportation to travel from destination A to destination B based on energy efficiency of each of the mode of transportation. The server may determine from a user profile whether the user have indicated user preferences for the modes of transportation, and based on user preferences and energy cost associated with each of the modes of transportation, the server may filter all available modes of transportation, and then display on the graphical user interface the modes of transportation having an optimal energy efficiency and an optimal cost to travel from destination A to destination B.

In one embodiment, a method for displaying multiple modes of transportation from a first geographic location to a second geographic location on a user interface of an electronic device of a user is disclosed. The method may include dynamically displaying, by a server, a plurality of first indicators where each first indicator corresponds to a route from the first geographic location to the second geographic location, wherein the plurality of first indicators are determined based on topographical data between the first geographic location and the second geographic location, wherein each route is based upon a mode of transportation and is dynamically adjusted based on traffic data received in real time. The method may further include dynamically displaying, by the server, a plurality of second indicators where each second indicator corresponds to an energy efficiency value associated with each route and its respective mode of transportation. The method may further include, in response to a selection of at least one route on the user interface by the user: modifying, by the server, the first indicator corresponding to the selected route to be visually distinct than remaining first indicators of the plurality of first indicators; and when the server determines that a corresponding mode of transportation of the selected route is associated with a transportation application installed on the electronic device, invoking the transportation application and displaying the transportation application in a foreground.

In another embodiment, a system may include a server configured to determine multiple modes of transportation from a first geographic location to a second geographic location; and an electronic device of a user, the electronic device comprising a user interface configured to dynamically display a plurality of first indicators where each first indicator corresponds to a route from the first geographic location to the second geographic location, wherein the plurality of first indicators are determined based on topographical data between the first geographic location and the second geographic location, wherein each route is based upon a mode of transportation and is dynamically adjusted based on traffic data received in real time; a plurality of second indicators where each second indicator corresponds to an energy efficiency value associated with each route and its respective mode of transportation; in response to a selection of at least one route by the user: modify the first indicator corresponding to the selected route to be visually distinct than remaining first indicators of the plurality of first indicators; and when the server determines that a corresponding mode of transportation of the selected route is associated with a transportation application installed on the electronic device, invoke the transportation application and displaying the transportation application in a foreground.

In another embodiment, a server-implemented method may include receiving, by a server, a request for a mode of transportation from a user device of a user to travel from a start location of the user device to a destination location where the request comprises a device identifier of the user device. The server-implemented method may further include determining, by the server, location data associated with the start location of the user device based on the device identifier of the user device. The server-implemented method may further include determining, by the server, a plurality of modes of transportation available to the user based at least in part on a profile data of the user retrieved from a database, the location data associated with the start location, and location data associated with the destination location. The server-implemented method may further include determining, by the server, energy consumption for each of the plurality of modes of transportation to travel from the start location to the destination location. The server-implemented method may further include identifying, by the server, the mode of transportation from the plurality of modes of transportation based at least in part on one or more attributes comprising at least the energy consumption for each of the plurality of modes of transportation to travel from the start location to the destination location. The server-implemented method may further include transmitting, by the server, a recommendation for the mode of transportation on a graphical user interface (GUI) of the user device of the user.

In another embodiment, a system may include a database storing user profile a server. The server is configured to receive a request for a mode of transportation from a user device of a user to travel from a start location of the user device to a destination location where the request comprises a device identifier of the user device. The server is further configured to determine location data associated with the start location of the user device based on the device identifier of the user device. The server is further configured to determine a plurality of modes of transportation available to the user based at least in part on a profile data of the user retrieved from a database, the location data associated with the start location, and location data associated with the destination location. The server is further configured to determine energy consumption for each of the plurality of modes of transportation to travel from the start location to the destination location. The server is further configured to identify the mode of transportation from the plurality of modes of transportation based at least in part on one or more attributes comprising at least the energy consumption for each of the plurality of modes of transportation to travel from the start location to the destination location. The server is further configured to transmit a recommendation for the mode of transportation on a graphical user interface of the user device of the user.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter disclosed herein.

DETAILED DESCRIPTION

Figure 1:
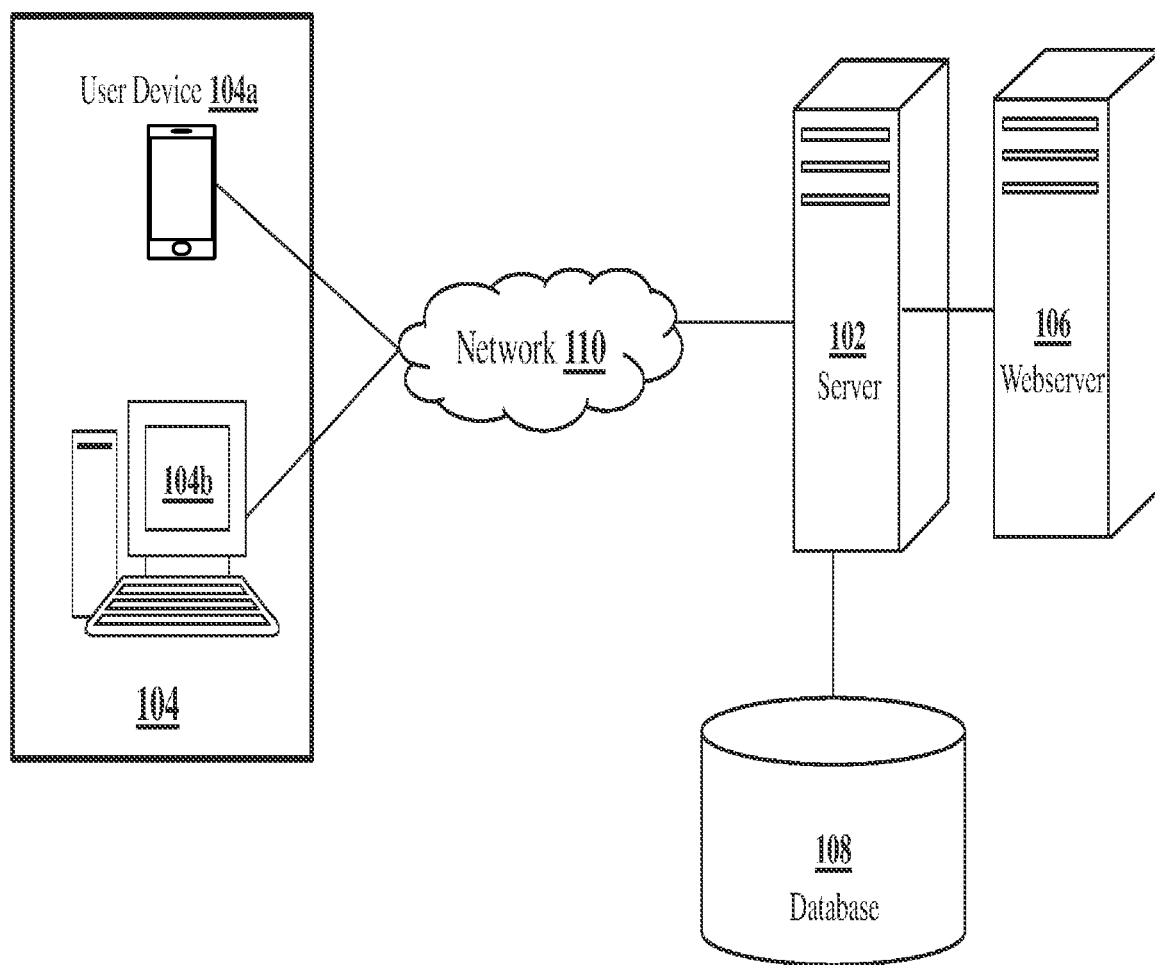
FIG. 1 shows components of a transportation management system for determining one or more modes of transportation for a user to travel from one location to another location, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows components of a transportation management system 100 for determining one or more modes of transportation for a user to travel from one location to another location. The transportation management system 100 may include servers 102, user devices 104, webservers 106, and databases 108. A server 102, the user devices 104, a webserver 106, and a database 108 are connected to each other through a network 110. The examples of the network 110 may include, but are not limited to, private or public LAN, WLAN, MAN, WAN, and the Internet. The network 110 may include both wired and wireless communications according to one or more standards and/or via one or more transport mediums. The communication over the network 110 may be performed in accordance with various communication protocols such as Transmission Control Protocol and Internet Protocol (TCP/IP), User Datagram Protocol (UDP), and IEEE communication protocols. In one example, the network 110 may include wireless communications according to Bluetooth specification sets, or another standard or proprietary wireless communication protocol. In another example, the network 110 may also include communications over a cellular network, including, e.g. a GSM (Global System for Mobile Communications), CDMA (Code Division Multiple Access), EDGE (Enhanced Data for Global Evolution) network.

In some embodiments, the system 100 described herein operate in a local computing environment where a user device 104 may transmit to a server 102 a request for determining one or more modes of transportation for a user to travel from one location to another location. The data and application programs corresponding to the user device 104 and the server 102 may be stored and executed on local computing resources. In some embodiments, the system 100 described herein operates in a cloud computing environment where a user device 104 may be cloud-optimized and transmit a request for determining one or more modes of transportation for a user to travel from one location to another location to a cloud-based server. The user device 104 data and application programs may be stored and executed on a remote cloud-based server accessed over a network cloud. In the cloud-computing environment, a web browser on the user device 104 may interface with an application program that is executed on the remote cloud-based server. Through the browser on the user device 104, a user can generate a request for determining the one or more modes of transportation for the user to travel from one location to another location and transmit the request to the remote cloud-based server via the application program.

In operation, a user operating a user device 104 may install a software application on the user device 104 that provides recommendation on one or more modes of transportation for a user to travel from one location to another location. The software application may implement user interfaces (UIs) that may include controls operable by a user to interact with the software application. The controls may include buttons, menus, pull-down menus, dialog boxes, scroll bars, and any other controls that enable the user to view the software application data, invoke the software application functionality, and otherwise interact with the software application. A visual representation of the software application may then be generated by rendering the UI state of the software application in the client program, e.g., a web browser running on the user device 104. A user may then generate and transmit a request using the software application on the user device 104 for a recommendation on a mode of transportation to travel from a destination A to a destination B. A server 102 hosting the software application receives the request from the user device 104. The server 102 will filter all available modes of transportation to travel from destination A to destination B using energy cost associated with each of the modes of transportation to travel from destination A to destination B. The server 102 may also determine from a user profile whether the user have indicated preferences for the modes of transportation in addition to determining the energy cost associated with each of the modes of transportation to travel from a destination A to a destination B. A filtration of all available modes of transportation by the server 102 can further use a wide range of pre-defined criteria in addition to the user preferences and the energy cost associated with each of the modes of transportation to travel from destination A to destination B. For instance, the server 102 based on data gathered from the user's previous travel patterns can determine whether the user prefers bikes, personal vehicles, or uses taxi often, and accordingly recommend a mode of transportation to travel from destination A to destination B. The server 102 may further look up a time of day of the receipt of the request, which can further inform processing related to generating transportation recommendations. For example, the server 102 by determining a time at which the request for a transportation recommendation is received may determine whether it is usual for the user to be biking, using private car, or public transportation to travel. Furthermore, the server 102 by generating and storing a historical log of the user's movements in a database 108 may learn what the user's habits are and preferred methods of the transportation. In addition, the server 102 may monitor to what degree the user has implemented the prior suggestion of transportations, and using the prior suggestion attribute the server 102 may further alter the degree it filters its modes of transportation results to the user.

A server 102 is a computing device comprising a processor and non-transitory machine-readable storage medium and capable of performing the various tasks and processes described herein during execution. Non-limiting examples of the server 102 may include a desktop computer, a mobile device, a server computer, a laptop computer, a tablet computer, and the like. For ease of explanation, FIG. 1 shows a single computing device functioning as the server 102. However, it should be appreciated that some embodiments may include any number of computing devices capable of performing the various tasks described herein.

The server 102 may receive personal information from a user operating a user device 104. For example, in order to register to a website and/or a software application hosted by the server 102 providing a mode of transportation and navigation routes between destinations, the user may be required to provide personal information associated with the user to the server 102. The personal information provided by the user is used by the server 102 to create a profile of the user consisting at least of one or more preferable modes of transportation of the user, user health data, and information of one or more vehicles owned by the user such as vehicle model number and vehicle mileage. The information associated with each of the one or more vehicles of the user may include vehicle registration name for each vehicle, an age of each vehicle, fuel mileage of each vehicle, total mileage of each vehicle, etc. Using the information associated with each vehicle, the server may calculate an amount of energy required by each vehicle to travel from a first location to a second location. For example, based on the current fuel mileage (for instance, 10 miles per gallon) of a first vehicle of the user, the server may calculate an amount of energy required to travel a particular distance by the first vehicle (for example, 2 gallons of gas required to travel 20 miles). Then based on the amount of energy required to travel a distance by the first vehicle, the server may further calculate a cost of energy (for example, if 1 gallon of gas costs $1, then to travel 20 miles, 2 gallons of gas will be required, which will cost $2). The user health data may include information related to the user's physical condition. For example, the health information may include blood pressure, electrocardiogram, heart rate, weight, height, skin temperature, body motion, and/or skin conductivity. The server 102 stores the user profile and the user health data in a database 108. The server 102 may transmit requests to the user device 104 after pre-determined time periods to receive updated health and personal data from the user, and accordingly the server 102 may update the user's current health data and the user profile stored in the database 108.

The server 102 may receive a request from a user device 108 operated by a user for a recommended mode of a transportation to travel for one location to another location. The request received by the server 102 may include information corresponding to the user (for example, username and/or user profile), a start location, and a destination location. In some embodiments, the request may further include information corresponding to a current location of the user. In some embodiments, the server 102 may receive the request that may include a device identifier of the user device 104 uniquely identifying the user device 104. The device identifier may include a phone number, an IP address, and a device ID.

The server 102 may determine location data of the start location of user and the destination location of the user. In some embodiments, the start location may be a current location of the user. In such a case, the server 102 may determine the location data of the current location of the user based on the device identifier uniquely identifying the user device 104. In some embodiments, the server 102 may determine the current location of the user using data received from one or more sensors on the user device 104. For example, the server 102 may process sensor data received from the user device 104 using one or more algorithms to obtain location of the current position of the user device 104 of the user.

Upon determining the location data of the start location and the destination location, the server 102 may determine an optimal mode of transportation for the user to travel from the start location to the destination location. In some embodiments, the server 102 may determine an optimal mode of transportation from the start location to the destination location based on energy cost associated with each of the available modes of transportation. In some embodiments, the server 102 may determine energy cost associated with each of the available modes of transportation based on each potential route linking the start location and the destination location. The server 102 may select a subset of the complete set of available routes linking the start location and the destination location based on factors such as distance, average speed limit, or toll charges. The server 102 may also determine cost of energy (for example, cost of fuel) required for all available modes of transportation that can be used by the user to go from the start location to the destination location. In order to determine the cost of energy required for all available modes of transportation, the server 102 may determine quantity of fuel required by all available modes of transportation and the cost of fuel at the time of request. Then based on the cost of energy for each of the available modes of transportation, the server 102 may determine a recommended mode of transportation from the available modes of transportation that is the most appropriate for a user. For instance, the server 102 may recommend the mode of transportation to a user that has a lowest cost of energy. In some embodiments, the server 102 may also use user's vehicle information stored in user's profile to determine a recommended mode of transportation from the available modes of transportation that is the most appropriate for a user. For example, the server 102 may process information associated with one or more vehicles of the user stored in a profile of the user, and based on the energy cost and the energy efficiency associated with each vehicle of the user, the server 102 may determine a recommended mode of transportation from the available modes of transportation that is the most appropriate for a user. For instance, the server 102 may recommend the mode of transportation to a user that has a lowest cost of energy. The mode of transportation may include user's vehicle and other public transportation options.

The server 102 may determine a mode of transportation for a user to travel from a start location to a destination location based on health information of user. In some embodiments, the server 102 may determine an optimal mode of transportation for a user to travel from a start location to a destination location based on geographic information from the start location to the destination location. In some embodiments, the server 102 may determine an optimal mode of transportation for a user to travel from a start location to the destination location based on health information of the user, geographic information from the start location to the destination location, and the energy information associated with each of the available modes of transportation to travel from the start location to the destination location.

The server 102 may determine the health information of the user using the user's profile information in order to determine an optimal mode of transportation for a user to travel from the start location to the destination location. The server 102 may retrieve the user profile information from the database 108 or receive the health information of the user from one or more external computing devices via a network 110. The user profile information stored in the database 108 may include information related to a user, for example, fitness history, medical history, and body information such as blood pressure, electrocardiogram, heart rate, weight, height, skin temperature, body motion, and/or skin conductivity etc. The server 102 may include a plurality of items of the user profile information corresponding to each user. The server 102 may determine which profile information to use of the user based on a user's input.

The server 102 may determine the geographic information from the start location to the destination location in order to determine an optimal mode of transportation for a user to travel from the start location to the destination location. The geographic information from the start location to the destination location may include any information related to topography or geography, such as total length of a route, elevation information of a route (for example, an uphill distance on a road and a downhill distance on a road), road conditions, a number of route facilities including crosswalks, etc. The server 102 may obtain the geographic information from an external apparatus or a GPS device that is connected to the server 102 via a network 110. In some embodiments, the geographic information determined by the server 102 may further include weather data (such as temperature), traffic data, and event data at each of the one or more routes between the start location and the destination location.

The server 102 may determine the geographic information such as the elevation data from the start location to the destination location from a database 108. The database 102 may include an elevation map memory for storing elevation data over a region. The server 102 reads out the elevation data from the elevation map memory for the start location to the destination location, and then the server 102 may use the elevation data to create a gradient map of the routes between the start location and the destination location. Based on the elevation data and the gradient map of the routes between the start location and the destination location, the server 102 may determine an optimal mode of transportation for a user to travel from the start location to the destination location. In some embodiments, based on the elevation data and the gradient map of the routes between the start location and the destination location, the server 102 may further determine obstructions in the region between the start location and the destination location. The server 102 may use obstructions to determine a travelable region between the start location and the destination location, and then further calculates all of possible traveling routes between the start location and the destination location based on the travelable region for avoiding the obstruction. The server 102 may then evaluate the traveling routes according to a predetermined rule to determine an optimal mode of transportation for a user to travel from the start location to the destination location for an optimum route from the start location and the destination location.

The server 102 may determine weather data in real-time related to current and historical weather conditions, as well as a prediction of future weather conditions, including radar and satellite data, temperature, wind and other observed weather conditions at each of the one or more routes between the start location to the destination location. The server 102 may track weather data or receive the weather data from external devices and data sources. The weather data determined by the server 102 may include, but not limited to, rain, tornados, hail, snow, ice, thunderstorms and hurricanes. The weather data determined by the server 102 may further provide an indication of natural disasters such as avalanches, earthquakes, floods, tsunamis, volcanic eruptions, landslides, and mudslides at each of the one or more routes between the start location and the destination location. The server 102 may store the weather data in the database 108.

The server 102 may determine and/or receive traffic data in real-time for each of the one or more routes between the start location and the destination location for each of the one or more modes of transportation available to the user. For instance, the server 102 may receive the traffic data at each of the one or more routes between the start location and the destination location from external devices and data sources. Non-limiting examples of the external devices and data sources may include, but are not limited to, government agency data, roadway observations from cameras or sensors, or Internet-based traffic data aggregators. Alternatively, the server 102 may record traffic data as the server 102 receives it, so that the server 102 maintains a record of historical traffic conditions in the database 108. The server 102 may then forecast traffic conditions at each of the one or more routes between the start location and the destination location based on locally executed algorithms.

The server 102 may determine physical characteristics of roadways, road segments, parking areas or other areas that will be traversed by each of the available modes of transportation such as car, bicycle, and bus in each of the one or more routes between the start location and the destination location. The physical characteristics information/data determined by the server 102 may further include the speed limit of each roadway, the number of lanes on the highway, exit destinations and merging roadways, weight limitations, toll locations, and capacity in each of the one or more routes between the start location and the destination location.

The server 102 may determine information related to real-time traffic conditions on roadways, parking areas or any other area where traffic flow or volume is impacted and/or observed at each of the one or more routes between the start location and the destination location. The information determined by the server 102 may further include congestion levels on roadways, traffic flow or rate of vehicle movement, a description of current road closings, bridge and railroad gate openings, and accident reports in each of the one or more routes between the start location and the destination location. In addition to current traffic information, the server 102 determines historical traffic data and predictions of future traffic conditions in each of the one or more routes between the start location and the destination location. The server 102 may store the traffic data information for each of the one or more routes between the start location to the destination location received from the external devices and data sources in the database 108.

The server 102 may determine events that are currently affecting traffic conditions or events that may affect traffic conditions in the future at each of the one or more routes between the start location and the destination location. Non-limiting examples of the events determined by the server 102 may include, but are not limited to, sports events, concerts, rallies, and community events such as festivals or parades. The server 102 may further determine information associated with the events that may include a venue for the event, a start time for the event, an end time for the event, roadway closures, and restrictions associated with the events. The data associated with the events may be stored by the server 102 in the database 108.

The server 102 may determine energy efficiency value based on energy consumption for each of the plurality of modes of transportation to travel from the start location to the destination location. For example, the server 102 determines type of fuel and cost of fuel required for each of the plurality of modes of transportation to travel from the start location to the destination location. A server 102 may further determine energy efficiency for each of the plurality of modes of transportation to travel from the start location to the destination location based on the energy consumption for each of the plurality of modes of transportation. A server 102 may further determine energy cost for each of the plurality of modes of transportation to travel from the start location to the destination location based on the energy efficiency for each of the plurality of modes of transportation to travel from the start location to the destination location.

The server 102 may identify an optimal mode of transportation for a user to travel from the start location to the destination location based on energy consumption for the mode of transportation in addition to the health information of the user, the geographic information from the start location to the destination location, and the user preferences. A server 102 may then transmit identified optimal mode of transportation to the user device 104. In some embodiments, the server 102 may rank each of the available modes of transportation to travel from the start location to the destination location based at least in part on the one or more attributes comprising at least the energy consumption for each of the available modes of transportation to travel from the start location to the destination location. A server 102 may then transmit the identified optimal mode of transportation to the user device 104 along with the rank of each of the plurality of modes of transportation to a graphical user interface of the user device 104 of the user.

The server 102 may further determine one or more routes that a user can use using the recommended optimal mode of transportation to travel from the start location to the destination location. In some embodiments, the server 102 may determine the one or more routes that the user can use using the recommended optimal mode of transportation to travel from the start location to the destination location based on information related to real-time traffic conditions on roadways, parking areas or any other area where traffic flow or volume is impacted and/or observed at each of the one or more routes between the start location to the destination location. The server 102 may determine the real-time traffic conditions on roadways, parking areas or any other area where traffic flow or volume is impacted and/or observed at each of the one or more routes between the start location to the destination location, or the server 102 may receive the real-time traffic conditions on roadways, parking areas or any other area where traffic flow or volume is impacted and/or observed at each of the one or more routes between the start location to the destination location from the external devices and data sources.

The server 102 may determine congestion levels on roadways, traffic flow or rate of vehicle movement, a description of current road closings, bridge and railroad gate openings, and accident reports in each of the one or more routes between the start location and the destination location, and then the server 102 may use the congestion levels on roadways, traffic flow or rate of vehicle movement, a description of current road closings, bridge and railroad gate openings, and accident reports to recommend a route that the user can use using the recommended optimal mode of transportation to travel from the start location to the destination location. In addition to the current traffic information, the server 102 may further determine historical traffic data and predictions of future traffic conditions in each of the one or more routes between the start location to the destination location, and then the server 102 may use the historical traffic data and predictions of future traffic conditions to recommend a route that the user can use using the recommended optimal mode of transportation to travel from the start location to the destination location. The server 102 may store the traffic data information for each of the one or more routes between the start location and the destination location received from the external devices and data sources in the database 108.

The server 102 may determine a route that the user can use using the recommended optimal mode of transportation to travel from the start location to the destination location based on events that are currently impacting traffic conditions or events that may impact traffic conditions in the future at each of the one or more routes between the start location and the destination location. Non-limiting examples of the events determined by the server 102 may include, but are not limited to, sports events, concerts, rallies, and community events such as festivals or parades. The server 102 may further determine information associated with the events that may include a venue for the event, a start time for the event, an end time for the event, roadway closures, and restrictions associated with the events. The data associated with the events may be stored by the server 102 in the database 108.

The server 102 may selectively determine whether to change the recommended route provided to the user device 104 operated by the user. The server 102 may determine whether to change the recommended route based on one or more factors such as weather condition or traffic condition. For example, if the weather condition or a traffic condition is updated at a predetermined time interval or if the weather condition or a traffic condition is updated when a distance difference between the user and an intersection is less than the threshold value, the server 102 may determine whether to change the recommended route whenever new updated weather condition or a traffic condition is presented to the server 102. If the recommended route has to be changed or is changed on the user device 104 operated by the user, the server 102 may inform the user through a sound or vibration that indicate that the recommended route has to be changed or have been changed.

User devices 104 are computing and/or telecommunications devices comprising a processor and capable of performing the various tasks and processes described herein, such as accessing a web server 106 and providing a GUI interface to a user/customer to interact with a customer-centric website hosted on the webserver 106. Non-limiting examples of a user device 104 may include a telephone 104*a* (e.g., POTS landline telephone, cellular telephone, smartphone), a user computer 104*b* (e.g., desktop, laptop, server, tablet), or any other telecommunications or computing device used to communicate with the system 100 services.

In some embodiments, a user device/customer device 104 is a computing device allowing a user/customer to interact with the server 102. In some embodiments, the user device 104 is a mobile device allowing a user to interact with the server 102 via a webserver 106. The user device 104 may execute an Internet browser or local application that access the webserver 106 in order to issue requests or instructions to the server 102 to access the system 100. The user device 104 may transmit credentials such as user identification inputs to the webserver 106 from which the webserver 106 may authenticate the user. One having skill in the art would appreciate that the user device 104 may comprise any number of input devices configured to receive any number of data inputs (e.g., mouse, keyboard, touchscreen, stylus), including various types of data inputs allowing for authentication, e.g., username, passwords, certificates, biometrics. The user device 104 is a computing device comprising a processor and non-transitory machine-readable storage medium allowing the user device 104 to perform the various tasks and processes described herein.

As an example of a user device 104 operation, a user operating the user device 104 may execute an Internet browser that accesses a webserver 106 hosting a website or a software application (such as a transport application) that allows the users to communicate with the server 102. Using the user device 104, a user may transmit personal data and/or transportation requests on a customer-centric mobile application/website providing a recommendation for a mode of transportation to travel from one location to another location. As the communication proceeds, the user device 104 may be used by the user to upload machine-readable computer files (e.g., PDF, DOC, XSL) containing personal data and transportation request information. The computer files may be stored into document records in a database 108. The user device 104 may issue queries or instructions to the server 102 via the webpages generated by the webserver 106, which then instruct the server 102 to perform various tasks, such as generating a recommendation for a mode of transportation to travel from one location to another location based on user's personal data and transportation request information. The recommendations for the modes of transportation to travel from one location to another location are then displayed on a graphical user interface and/or a display of the user device 104. The recommendations may include multiple indicators displayed on the GUI. One indicator may correspond to a route to travel from one location to another location. Another indicator may correspond to a vehicle associated with a particular route to travel from one location to another location. Yet another indicator may correspond to a time and a distance value associated with a particular route and a particular vehicle to travel from one location to another location. Yet another indicator may correspond to an energy efficiency value associated with a particular route and a particular vehicle to travel from one location to another location.

A webserver 106 is a computing device hosting a software application (such as a transport application) accessible to the server 102 via the Internet. In some embodiments, the webserver 106 may be any computing device hosting a website accessible to the user devices 104 via the Internet. The website or the software application hosted by the webserver 106 may provide a recommendation for a mode of transportation between two locations. The web site or the software application hosted by the webserver 106 may also provide a recommendation for a travelling route between two locations. The webserver 106 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single webserver 106, in some embodiments the webserver 106 may include any number of computing devices operating in a distributed computing environment.

The webserver 106 may execute software applications configured to host a website (e.g., Apache®, Microsoft IIS®), which may generate and serve various webpages to the server 102 on receiving a request from the user device 104 to provide information regarding a recommended mode of transportation between two locations. In some embodiments, the webserver 106 may execute software applications configured to host a website (e.g., Apache®, Microsoft IIS®), which may generate and serve various webpages to user devices 104 providing information regarding recommended mode of transportation between two locations. The software application and/or the website may be used to generate and access data stored on a database 108. In some implementations, the webserver 106 may be configured to require user/customer authentication based upon a set of customer authorization credentials (e.g., username, password, biometrics, cryptographic certificate). In such implementations, the webserver 106 may access the database 108 configured to store customer credentials, which the webserver 106 may be configured to reference in order to determine whether a set of entered credentials purportedly authenticating the user match an appropriate set of credentials that identify and authenticate the user. Similarly, in some implementations, the webserver 106 may generate and serve webpages to the user devices 104 based upon a user profile within the system 100. In such implementations, the user profile may be defined by information fields in the user records stored in the database 108, and authentication of the user may be conducted by the webserver 106 by executing an access directory protocol. The webserver 106 may then be instructed to generate webpage content, access or generate data stored in the database 108, according to the user profile defined in the user record in the database 108.

Databases 108 are capable of storing information records in plain format and/or encrypted version containing data fields that are associated with a customer/user. The databases 108 may be in communication with a processor of the server 102, where the processor is capable of executing the various commands of the system 100. In some embodiments, the databases 108 may be part of the server 102. In some embodiments, the databases 108 may be a separate component in communication with the server 102.

The database 108 may be hosted on any number of computing devices comprising a non-transitory machine-readable storage medium and capable of performing the various tasks described herein. As shown in FIG. 1, the database 108 may be accessed by the server 102 and other devices of the system 100 via one or more networks 110. The database 108 may be hosted on the same physical computing device functioning as the server 102 and/or functioning as other devices of the system 100. In some embodiments, the database 108 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the server 102 and/or components of the system 100.

The database 108 may store data records associated with various aspects of the application services offered to end users/customers. Non-limiting examples of what may be stored in the database 108 may include user records that may comprise data fields describing users, e.g., customer data, such as customer credentials (e.g., username, passwords, biometrics, encryption certificates), customer vehicle data, customer health data such as blood pressure, electrocardiogram (ECG), heart rate, breath condition, weight, height, skin temperature, body motion, and/or skin conductivity; customer permissions; location information such as, digital maps, navigation durations, navigation directions, traffic information, weather information at or near a location; document records that may comprise machine-readable computer files (e.g., word processing files), parsed portions of such computer files, or metadata associated with computer files; and application data that may include software instructions executed by a server 102 or data used by the such applications executed by the server 102. The data records associated with various aspects of the application services offered to end users/customers may be organized within the database 104 according to user profiles, various transportation modes, geographic locations, time of day/week/month, etc.

In some embodiments, the server 102 may access the data within the database 108, for instance, by executing a query command related to a particular mode of transportation and responsive to the query command, obtain information about the particular mode of transportation. The server 102 may use the information retrieved from the database 108 to determine whether the particular mode of transportation is an available mode of transportation for a user of the user device 104 to travel between a start location and a destination location.

Figure 2:
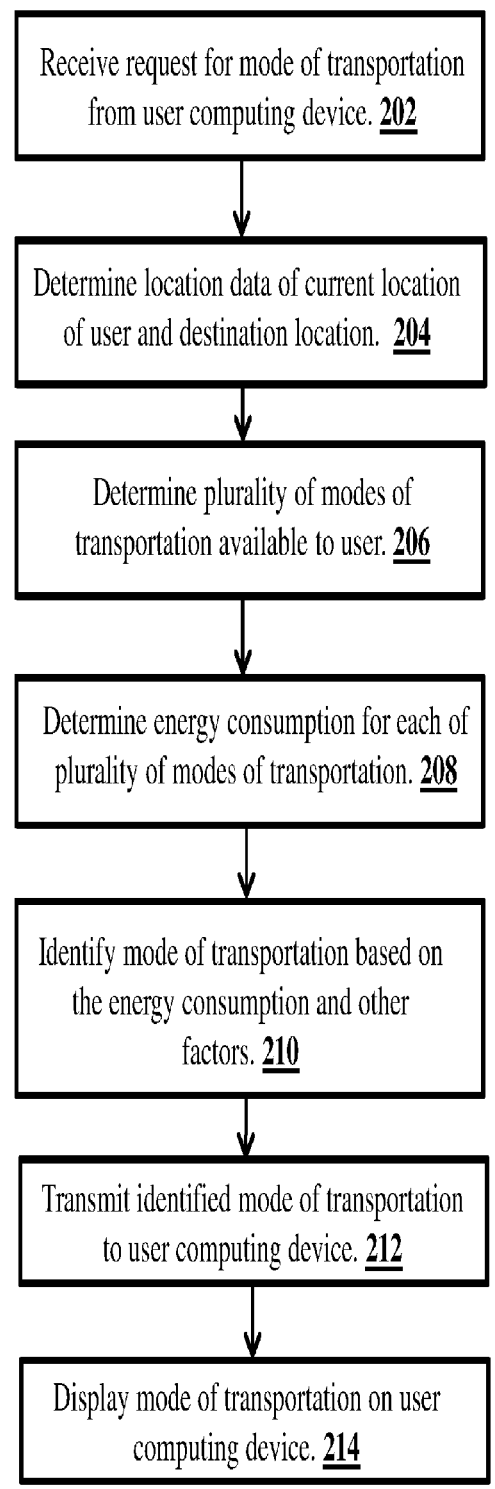
FIG. 2 shows execution of a method of a transportation management system for determining one or more modes of transportation for a user to travel from one location to another location, according to an embodiment.

FIG. 2 shows execution steps for determining one or more modes of transportation for a user to travel from one location to another location, according to a method 200. The method 200 shown in FIG. 2 comprises execution steps 202, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a single server computer in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the server computer described herein.

In a first step 202, a server may receive a request for a mode of transportation from a user device operated by a user. The request received by the server may include inputs regarding a start location and a destination location of the user. In some embodiments, the request may further include details regarding time and date at which the user wants to travel between the start location and the destination location. In some embodiments, the request may further include a device identifier uniquely identifying the user device operated by the user for generating and transmitting the request. The device identifier of the user device may be selected from a group consisting at least one of a phone number, an IP address, and a device ID of the user device.

In a next step 204, a server may determine location data of the start location of user and the destination location of the user based on inputs received in the request from the user. In some embodiments, the start location may be a current location of the user. In such a case, the server may determine the current location of the user based on a current location of the user device operated by the user. In some embodiments, the server may determine the current location of the user device based on sensor data received from a sensor integrated in the user device. In some embodiments, the server may determine the current location of the user device based on the user device identifier such as a phone number, an IP address, and a device ID uniquely identifying the user device. For example, a server may determine a current location of a user device using location data given by the user device phone network, i.e., cell-identification data. In such a case, a server may then determine in which cell area of the user device phone network the connection in question is at any moment. If more precise location of the user device is desired, then a user device has been able to be located more precisely by the server by combining data given by other devices closest to the user's user device. The result generated by the server is then a location area for the user device, formed by the intersection of the user device cell-coverage areas.

The server may also determine a current location of a user device based on a telephone network of the user device. The server may measure the signal data, and particularly the strength of the signal sent by a base station of the user device network, and includes the strength of the signal measurement data in a message to be sent to a request to be ordered through the user device network operator. Based on the strength of the signal measurement data sent by the server, the location and direction of movement of the user device are calculated by the telephone network operator.

The server may also determine location of a user device operating in a wireless local-area network using a Wi-Fi triangulation method. The Wi-Fi triangulation method executed by the server characterizes location of the user device based on a received signal strength of the wireless access points that cover an area. A calibration phase is first done by the server to record the values of the signal strength throughout the area in which user device is intended to be tracked. After the calibration phase done by the server, the server uses the values of the access point signal strengths to find the user device location. In some implementations, the wireless triangulation location method executed by the server compares measured wireless signal strength to a table of wireless signal strengths and known locations, finds the table entry with the closest signal strength to the measured signal strength and determines user device location by reference to the table entry.

In a next step 206, a server may determine one or more modes of transportation available to user to travel from the start location to the destination location. In some embodiments, the one or more modes of transportation available to the user to travel from the start location to the destination location may include bike, car, taxi, bus, train, metro, and airplane. In some embodiments, the server may determine the one or more modes of transportation available to the user to travel from the start location to the destination location based on data in the user profile. For instance, the user profile data of the user may include one or more preferable modes of transportation of the user, user health data, and information of one or more vehicles owned by the user. The information associated with each of the one or more vehicles of the user may include vehicle registration name for each vehicle, an age of each vehicle, fuel mileage of each vehicle, total mileage of each vehicle (e.g., odometer reading), etc. Using the information associated with each vehicle, the server may calculate an amount of energy required by each vehicle to travel from a first location to a second location. For example, based on the current fuel mileage (for instance, 10 miles/gallon) of a first vehicle of the user, the server may calculate an amount of energy required to travel a particular distance by the first vehicle (for example, 2 gallons of gas required to travel 20 miles). Then based on the amount of energy required to travel a distance by the first vehicle, the server may further calculate a cost of energy (for example, if 1 gallon of gas is for 1 dollar, then to travel 20 miles, 2 gallons of gas will be required, which will cost 2 dollars).

In a next step 208, a server may determine energy consumption for each of the plurality of modes of transportation available to the user to travel from the start location to the destination location. In some embodiments, the server may determine energy efficiency value for each of the plurality of modes of transportation to travel from the start location to the destination location based on the energy consumption (for example, fuel consumption) for each of the plurality of modes of transportation to travel from the start location to the destination location. The server may then determine energy cost for each of the plurality of modes of transportation to travel from the start location to the destination location based on the energy efficiency value for each of the plurality of modes of transportation to travel from the start location to the destination location. In some embodiments, the server may determine energy cost for each of the plurality of modes of transportation to travel from the start location to the destination location based on cost of fuel required for each of the plurality of modes of transportation to travel from the start location to the destination location.

The server may also dynamically calculate/update the energy efficiency value for each of the plurality of modes of transportation to travel from the start location to the destination location in accordance with other factors and variables described herein. For instance, the energy efficiency value for a mode of transportation to travel from the start location to the destination location may depend on one or more other variables, such as weather condition (e.g., temperature, precipitation, and the like), energy indexes associated with the mode of transportation (e.g., efficiency indexes of the mode of transportation, fuel consumption indexes for different routes and different temperatures, and the like), traffic conditions for each mode of transportation to travel from the start location to the destination location, and other relevant travel attributes. The server may use one or more of the above-described factors/attributes to calculate the energy efficiency value. The server may execute a predetermined energy efficiency protocol that uses a predetermined algorithm to calculate the energy efficiency value using one or more of the above-described variables.

In some configurations, the server may use a weighted combination of the above-mentioned factors and variables to calculate the energy efficiency value for each of the plurality of modes of transportation to travel from the start location to the destination location. For instance, when the value of the measured temperature satisfies a predetermined threshold, a vehicle's energy efficiency value may be decreased. This may be due to an increased probability of air conditioning usage, which increases the fuel consumption and decreases the energy efficiency value of the vehicle. Therefore, when the measured temperature satisfies a predetermined threshold, the server may assign a higher weight to the temperature than other factors and variables described above while calculating the energy efficiency value.

The calculated energy efficiency value may not be a static value because the server may dynamically update the energy efficiency value for different modes of transportation in real time. For instance, the server may calculate an energy efficiency value for driving a vehicle from location A to location B based on a distance, fuel efficiency index for the vehicle in the identified temperature, traffic (e.g., in some embodiments, traffic may affect the vehicle's fuel efficiency), and/or weather conditions (e.g., some precipitation may directly affect the vehicle's fuel consumption or indirectly affect the vehicle's fuel consumption by creating traffic congestions). The server may then iteratively and dynamically update the energy efficiency value based on a change in one or more conditions described above. For instance, the server may update the energy efficiency value for a vehicle when traffic conditions change. As described below, the server may continuously update the energy efficiency value for each of the plurality of modes of transportation to travel from the start location to the destination location by iteratively querying different travel conditions affecting the energy efficacy value between the start location and the destination location, and recalculating the energy efficiency value. As described below, the server may also dynamically update the graphical user interface (viewed by the user) to reflect the latest energy efficiency value for each of the plurality of modes of transportation to travel from the start location to the destination location.

In a next step 210, a server may determine a mode of transportation from the plurality of modes of transportation based on the energy consumption (for example, lowest fuel consumption or lowest cost of fuel consumption). In some embodiments, the server may determine an optimal mode of transportation from the plurality of modes of transportation to travel from the start location to the destination location based at least in part on the one or more attributes. As described herein, the server may not limit the identification to the energy efficiency value. The server may also use one or more attributes including, but not limited to, weather condition of the start location of the user, weather condition of the destination location, and weather condition of locations between the start location and the destination location. The one or more attributes used by the server may further include traffic condition at the start location of the user and traffic condition at the locations between the start location and the destination location. The one or more attributes used by the server may further include a budget amount set by a user and stored in a database. For example, the user may set a budget amount for each day, each week, or each month, and based on the budget amount, the server may select a mode of transportation from the plurality of modes of transportation that is within the user budget.

The server may select an optimal mode of transportation from the plurality of modes of transportation based on lowest energy consumption (for example, lowest fuel consumption or lowest cost of fuel consumption), weather condition of the start location of the user, weather condition of the destination location, weather condition of locations between the start location and the destination location, traffic condition at the start location of the user, traffic condition at locations between the start location and the destination location, and a budget amount set by the user.

The server may rank each of the plurality of modes of transportation to travel from the start location to the destination location based at least in part on the one or more attributes (such as travel attributes) comprising at least the energy consumption for each of the plurality of modes of transportation to travel from the start location to the destination location. In some embodiments, a server may rank each of the plurality of modes of transportation to travel from the start location to the destination location based at least in part on the energy consumption for each of the plurality of modes of transportation to travel from the start location to the destination location, weather condition of the start location of the user, weather condition of the destination location, weather condition of locations between the start location and the destination location, traffic condition at the start location of the user, traffic condition at locations between the start location and the destination location, and a budget amount set by the user.

In some configurations, the server may use a predetermined weighting factors or the user's preferences to identify the modes of transportation to travel from the start location to the destination location. For instance, if only considering fuel consumption or energy efficiency values, the server may always rank walking or riding a bicycle as the best options because these options do not require any fuel consumption However, these options may not be realistic or desired by a user. For instance, walking or riding a bicycle to a destination location has a far higher energy efficiency value than taking a vehicle. However, walking or taking a bicycle may also have a higher corresponding travel time than a vehicle. Therefore, the server may use a predetermined algorithm that accounts for travel time, energy efficiency, and overall cost (e.g. directly, such as fuel costs, and indirectly, such as vehicle maintenance) when selecting and/or ranking different modes of transportation.

The server may also account for user preferences, stored in a database, when ranking and/or identify different modes of transportation. For instance, a user may not desire to walk or ride a bicycle when the temperature is below a predetermined threshold or when chance of precipitation is higher than a predetermined threshold. Therefore, when one or more of these thresholds are met, the server may no longer display walking or riding a bicycle as modes of transportation.

In a next step 212, a server may transmit determined optimal mode of transportation to the user device. In some embodiments, the server may transmit each of the plurality of modes of transportation along with the rank of each of the plurality of modes of transportation to a graphical user interface of the user device of the user. A recommended mode of transportation is then displayed on a graphical user interface of the user device at step 214. The user upon the accepting the recommended mode of transportation on the graphical user interface of the user device, may further receive recommendation of one or more routes for travelling from the start location to the destination location using the recommended mode of transportation. For example, the server may automatically generate a route message to provide directions from the user's current location to a destination location based on information such as a start location, a destination location, recommended mode of transportation and its classification (for example, number of axels, weight, etc.), and number and cost of tolls. In some embodiments, the server may automatically generate updated route messages based on some event (e.g., a user's deviation from an assigned route) and then transmit the updated route messages to the user device.

The server may determine one or more routes for the user to travel from the start location to the destination location based on one or more user preferences related to past, current, and future route requests by the user and/or the user device. For example, user preferences may include types of routes preferred by the user; types of roads traveled, preferred vehicle type, and preferred time of day for travel. In some embodiments, the server may generate a single route message for the user device to provide directions between a start location and a destination location. In some embodiments, the server periodically sends modified route messages to the user device based on real-time data and the user's updated position. The update interval for such a message may be set by the user or, alternatively, the server may provide a preset periodic value.

The server may display on a GUI of a user device various transportation options and various indicators corresponding to different travel attributes for each route and each transportation mode. In this way, the server displays multiple transportation options for the user to select an ideal route and/or a transportation mode. As described throughout, the user's selection of the transportation mode may not always correspond to the highest energy efficiency value, the lowest travel cost, the lowest travel time, and/or the least distance. Therefore, even though the server may identify an ideal route and/or a transportation mode, the user may select differently.

Figure 3A:
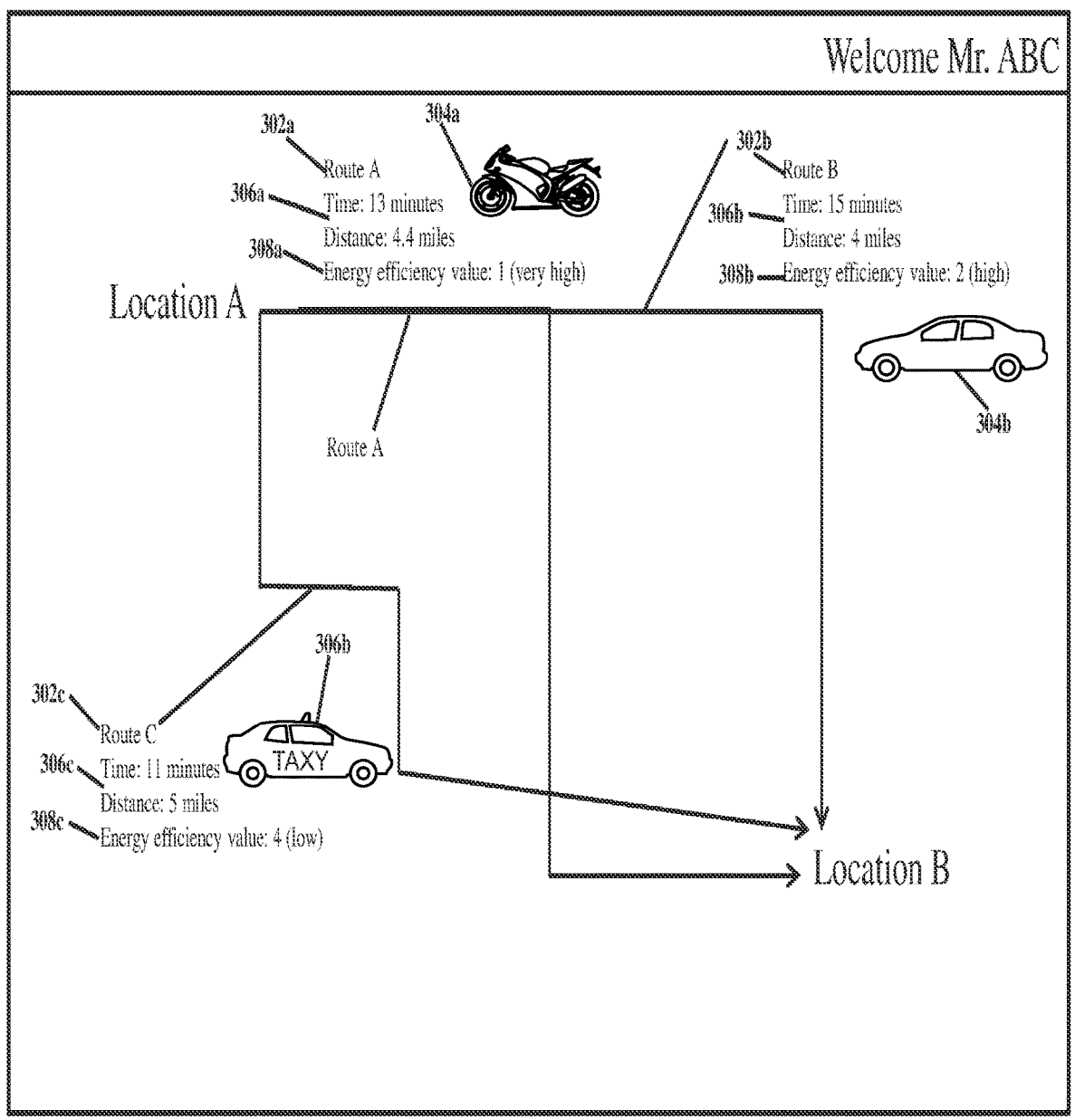
FIG. 3A shows a user interface of a user device displaying multiple modes of transportation from a first geographic location to a second geographic location, according to an embodiment.

FIG. 3A shows a user interface 300 of a user device displaying multiple modes of transportation from a first geographic location to a second geographic location. The user device may be any portable or non-portable device, such as a mobile device, a tablet computer, a smart phone, a smart watch, a laptop computer, a personal digital assistant, or the like. The user device may include a processor/microcontroller and/or any electronic components that performs one or more operations according to one or more programming instructions. The user device may be capable of communicating with a system server through a communications network using wired or wireless communication capabilities.

A transport management application may be installed on a user device of a user or may be configured to display on a website of a transport management company. For example, a transport management company may generate the transport management application as a widget configured to communicate with the user, and the widget may be displayed on the website of the transport management company. The user device may have access to one or more databases or pre-stored web-based interfaces, such as webpages, comprising a number of preconfigured sub-interfaces, or containers, that are dynamically populated (e.g., widget box). For example, transport management application webpages may contain code, such as HTML, or PHP, presenting a website of any number of webpages having a common look-and-feel. One or more outputs or results may display webpages that may contain additional code for containers, where the container code displays the transport management application widget. The user may access a webpage and interact with the user device via the transport management application. In some implementations, the user device may be configured to require user authentication based upon a set of user authorization credentials (e.g., username, password, biometrics, cryptographic certificate) to provide access to the transport management application on the user device. For example, the user device may access a database configured to store the user credentials, which a webserver may be configured to reference in order to determine whether a set of entered credentials purportedly authenticating the user match an appropriate set of credentials that identify and authenticate the user. Similarly, in some implementations, the webserver may generate and serve transport management applications/webpages associated with the transport management application to the user device based upon a user membership account. In some embodiments, the webserver may generate and serve applications/webpages associated with the transport management application (such as the webpage) to the user device based upon the user membership. The user membership may be defined by data fields in the user records stored in the database, and authentication of the user and the user membership may be conducted by the webserver by executing an access directory protocol.

During operation, a user may access a webpage by any common access method, e.g., keying in a URL, selecting from search results, etc., and submit user credentials to access a transport management application. Upon the webserver authenticating the user using credentials that identify the user as a valid member of a transport management application company, the user is presented the transport management application. Initially, the transport management application may be a description window that may provide information regarding creating an account. If the user already has an account, the user may click "I have an account" button on the transport management application to access their account by providing the email address and the password information. The transport management application may then display an account of the user that may include information such as budget of the user, one or more connected sources such as weather and traffic data sources to the transport management application, user health records, user list of vehicle, and prior travel history of the user.

A user may then use the transport management application on the user device to transmit a request for recommendations for modes of transportation from a first geographic location (location A) to a second geographic location (location B). In response to the user request, a server may process data associated with the user request, and display an output on the user interface 300 of the user device. In some embodiments, in response to the user request, a server may process the data associated with the user request, and display a dynamic output on the user interface 300 of the user device. For instance, the output, which may be dynamic, may include a plurality of indicators. The indicators may include at least a plurality of first indicators 302, a plurality of second indicators 308, a plurality of third indicators 306, and a plurality of fourth indicators 304.

Each first indicator 302*a*, 302*b*, and 302*c* of a plurality of first indicators 302 corresponds to a route marked on a map displayed on the user interface 300 of the user device from the location A to the location B. A server may determine each route represented by the first indicator 302*a*, 302*b*, and 302*c* of the plurality of first indicators 302 based on processing of geographical and/or topographical data between the location A and the location B. A server may dynamically adjust each route represented by the plurality of first indicators 302 based on traffic data received in real time. Each route represented by the plurality of first indicators 302 is further associated with at least one mode of transportation 304*a*, 304*b*, and 304*c*.

Each second indicator 308*a*, 308*b*, and 308*c* of a plurality of second indicators 308 corresponds to an energy efficiency value associated with each route and its respective mode of transportation. For example, a second indicator 308*a* may represent an energy efficiency value of 1 when taking a route A on a motorcycle. Similarly, a third indicator 308*b* may represent an energy efficiency value of 2 when taking a route B on a car. Similarly, a third indicator 308*c* may represent an energy efficiency value of three when taking a route C on a taxicab.

Each fourth indicator 304*a*, 304*b*, and 304*c* of a plurality of fourth indicators 304 corresponds to the at least one mode of transportation associated with each route represented by the plurality of first indicators 302*a*, 302*b*, and 302*c*. For example, a first indicator 302*a* may represent a route A, and is associated with a fourth indicator 304*a*, which may represent a mode of transportation such as a motorcycle. Similarly, a first indicator 302*b* may represent a route B, and is associated with a fourth indicator 304*b*, which may represent a mode of transportation such as a car. Similarly, a first indicator 302*c* may represent a route C, and is associated with a fourth indicator 304*c*, which may represent a mode of transportation such as a taxi cab.

Each third indicator 306*a*, 306*b*, and 306*c* of a plurality of third indicators 306 corresponds to a time and a distance to travel from the location A to the location B. Each third indicator 306*a*, 306*b*, and 306*c* of the plurality of third indicators 306 also corresponds to each route and its corresponding mode of transportation. For example, a third indicator 306*a* may represent a time (13 minutes) and a distance (4.4 miles) to travel from the location A to the location B when taking a route A on a motorcycle. Similarly, a third indicator 306*b* may represent a time (15 minutes) and a distance (4 miles) to travel from the location A to the location B when taking a route B on a car. Similarly, a third indicator 306*c* may represent a time (11 minutes) and a distance (5 miles) to travel from the location A to the location B when taking a route C on a taxi cab.

Figure 3B:
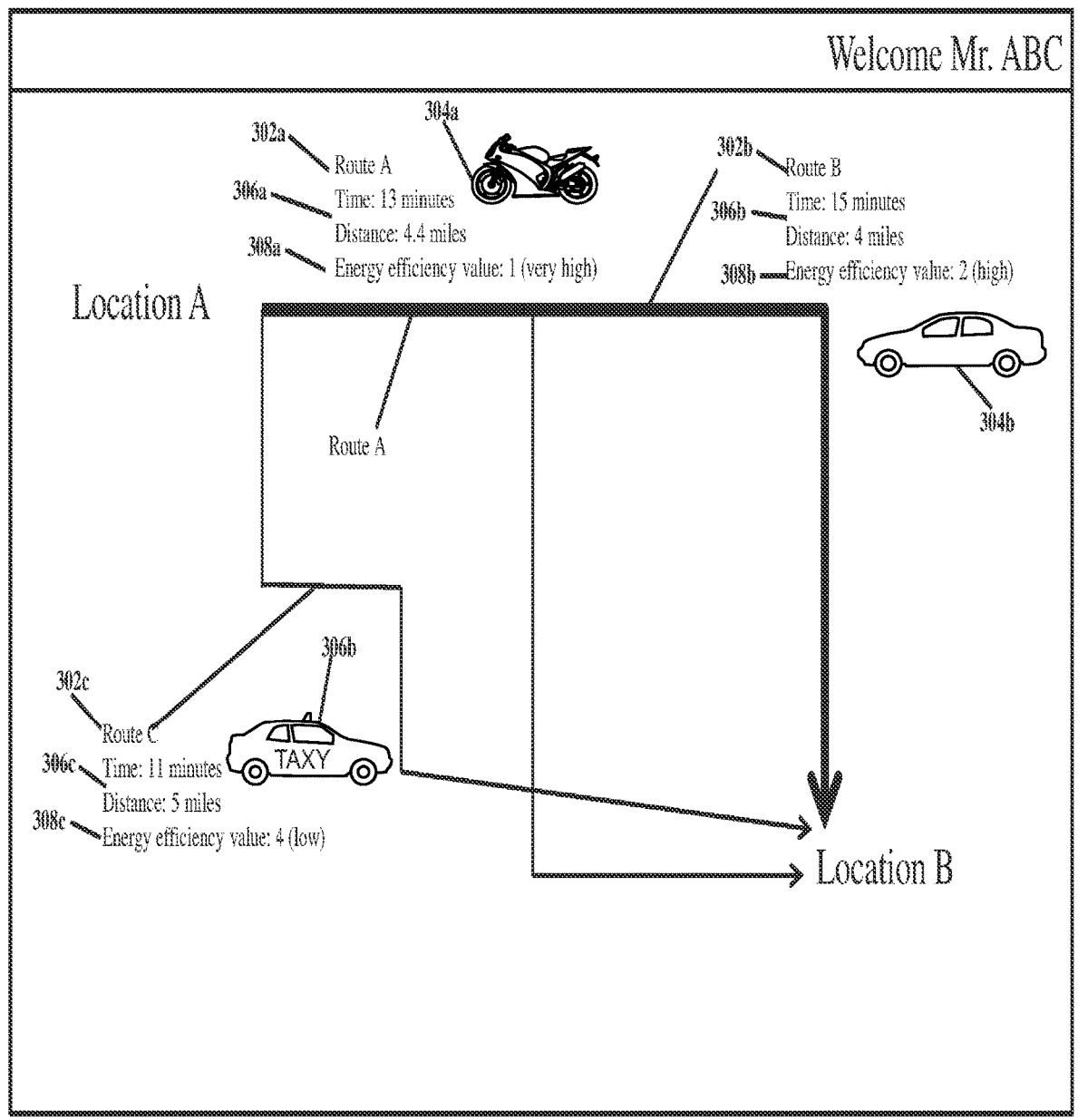
FIG. 3B shows a user interface of a user device displaying multiple modes of transportation from a first geographic location to a second geographic location, according to an embodiment.

A user may select at least one route from an option of route A, route B, and route C displayed on a user interface 300 of a user device. In response to a selection of at least one route (for example, a route B) on the user interface 300 of the user device by the user, a server of the transport management system may modify the first indicator 302b corresponding to the route B to be visually distinct (for example, bolder in color) than remaining first indicators 302a and 302c, as depicted in the FIG. 3B. The server may then process information associated with a mode of transportation 304b (car) linked to the route B selected by the user. During the processing, the server may determine whether any transportation application (such as commercial taxi application) is installed on the user device, which the server may use in order to request the car for the user. Upon the server determining that such commercial taxi application is installed on the user device, the server may then invoke the commercial taxi application, and display the commercial taxi application in a foreground. At the same time, the transport management application goes into the background on the user device. The user may then use the commercial taxi application to order the car.

Example

In a non-limiting example, a user accesses a graphical user interface (GUI) operated by a server, such as a server 106 described in FIG. 1, and enters various trip attributes, such as a start location and a destination location. In some embodiments, the user may also input a travel time. The travel time may correspond to a time at which the user prefers to begin the journey from the start location. The travel time may also correspond to a time at which the user prefers to reach the destination location. The travel time may also correspond total time user prefers to spend travelling from the start location to the destination location. As described above, the server may update the GUI and display a map comprising multiple possible routes from the start location to the destination location, and multiple possible modes of transportation for each route. For example, the server may display three routes where the first route is associated with a personal vehicle, the second route is associated with a public transportation, and the third route is associated with a bicycle. The server may also calculate an energy efficiency value for each route and each mode of transportation, and may dynamically display an indicator associated with each calculated energy efficiency value on the GUI. For instance, the server may display a first indicator corresponding to each mode of transportation, a second indicator corresponding to a calculated estimated time of arrival or travel duration, a third indicator corresponding to a distance of each route, and a fourth indicator corresponding to the energy efficiency value.

As described above, the energy efficiency value may be calculated via executing a predetermined protocol that uses various travel attributes and other inputs. For instance, the server may query weather conditions (including temperature and precipitation), traffic conditions, fuel consumption indexes for each mode of transportation, travel distance for each route, fuel prices, and other relevant travel attributes/conditions. The server may then execute the predetermined protocol using the above described factors and variables to determine the energy efficiency value for each mode of transportation when driving on each route.

As described above, the server may iteratively and continuously query the above-mentioned variables. When the server detects a change in at least one variable, the server may recalculate the energy efficiency value and dynamically update the GUI. For instance, the server may calculate the energy efficiency value for a personal vehicle taking a particular route at a particular time. The server may continuously query one or more disparate data sources to receive traffic data. When the traffic data received deviates from the traffic data used to calculate the initial energy efficiency value (e.g., traffic has changed due to an accident unrelated to the user) the server may recalculate the energy efficiency value based on the new traffic data and dynamically update the GUI.

In some embodiments, the above-mentioned method may be executed by an application executing in the background, as a browser plug-in, and/or as an extension to another application. For instance, the server may monitor the user's activity on an electronic device (e.g., mobile device or a computer) using a background process and in a manner invisible to the user. When the server determines that the user is using a third-party GPS or other navigation application, the server may display the above-mentioned information in the foreground. In a non-limiting example, the server may monitor the user's activity on his or her mobile device via an application executing as a background process on the user's mobile device. The user may initiate a third-party navigation application and input travel attributes, such as current location, destination location, and the like. Upon determining that the user has requested navigation data from the third-party application, the server may use an application programming interface (API) to retrieve the user's inputted travel attributes. The server may also access the user profile and retrieve other data necessary to calculate energy efficiency value for each route and/or each mode of transportation. The server may then display various indicators on the GUI, as described above.

In some embodiments, the indicators described above may be transmitted to the third-party application to be displayed along with other navigation data. In some embodiments, the server may directly display the above-mentioned indicators on the third-party application's GUI. In this way, the user may view the indicators described above without directly interacting with the server. Furthermore, the server allows the user to perform other operations (e.g., execute other applications) concurrently with the operations of the server because the server is executing in the background without displaying anything in the foreground until necessary or requested. In other words, the server does not hinder the operation of other applications and, in this way, the display screen of the user's electronic device is "free" for other operations.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system operable to display at least one mode of transportation from a first geographic location to a second geographic location on a user interface, the system comprising:
   one or more hardware processors; and
   a non-transitory memory storing instructions that, when executed by the one or more hardware processors, cause the one or more hardware processors to perform operations, comprising:
   instructing a display to generate and present a plurality of route indicators for a plurality of routes, wherein each route indicator of the plurality of route indicators corresponds to a route of the plurality of routes from the first geographic location to the second geographic location, wherein the plurality of routes is determined based on topographical data between the first geographic location and the second geographic location, wherein each route of the plurality of routes is based upon a mode of transportation and is adjusted based on traffic data, weather data, or both;
   instructing the display to generate and present a plurality of energy efficiency indicators, wherein each energy efficiency indicator of the plurality of energy efficiency indicators corresponds to a respective energy efficiency value, a respective mode of transportation, or both for a respective route of the plurality of routes;
   modifying a user-selected route indicator of the plurality of route indicators to be visually distinct from remaining route indicators of the plurality of route indicators; and
   invoking a transportation application in response to determining that a corresponding mode of transportation of a user-selected route is associated with the transportation application.

2. The system of claim 1, wherein the respective energy efficiency value is based on an energy consumption value and the respective mode of transportation associated with the respective route of the plurality of routes from the first geographic location to the second geographic location.

3. The system of claim 2, wherein the energy consumption value is based on or corresponds to an energy cost.

4. The system of claim 3, wherein the energy cost is based on a cost of fuel required to travel on the respective route.

5. The system of claim 1, wherein the display is associated with a device identifier that uniquely identifies an electronic device comprising the display.

6. The system of claim 5, wherein the device identifier comprises a phone number, an IP address, or a device ID, or a combination thereof.

7. The system of claim 5, wherein the electronic device is configured to access profile data remotely stored in a database, wherein the profile data comprises one or more user preferences for modes of transportation, user health data, or data associated with one or more vehicles owned by a user, or a combination thereof.

8. The system of claim 1, wherein the operations comprise dynamically adjusting the plurality of routes based on the traffic data, the weather data, or both.

9. A processor-implemented method, comprising:
   receiving, via a computing device, topographical data between a first geographic location and a second geographic location;
   determining, via the computing device, a plurality of routes from the first geographic location to the second geographic location based on the topographical data, wherein each route of the plurality of routes is based upon a mode of transportation and is adjusted based on traffic data, weather data, or a combination thereof;

determining, via the computing device, an energy efficiency value and the mode of transportation for each route of the plurality of routes;

receiving, via the computing device, a selection of at least one route of the plurality of routes; and invoking, via the computing device, a transportation application in response to determining that a corresponding mode of transportation of the at least one route is associated with the transportation application.

10. The processor-implemented method of claim 9, wherein invoking the transportation application comprises invoking a commercial taxi application based on the corresponding mode of transportation of the at least one route being associated with a taxi service.

11. The processor-implemented method of claim 9, comprising displaying, via the computing device, a plurality of route indicators corresponding to the plurality of routes from the first geographic location to the second geographic location.

12. The processor-implemented method of claim 11, comprising:

in response to the selection of the at least one route, modifying a route indicator corresponding to the at least one route to be visually distinct from remaining route indicators of the plurality of route indicators.

13. The processor-implemented method of claim 9, wherein the energy efficiency value is based on an energy consumption associated with a corresponding route and the mode of transportation for the corresponding route.

14. The processor-implemented method of claim 13, wherein the energy efficiency value is based on an energy cost related to the energy consumption associated with the corresponding route and the mode of transportation for the corresponding route.

15. The processor-implemented method of claim 14, wherein the energy cost is determined based on a cost of fuel required to travel via the corresponding route with the mode of transportation.

16. A non-transitory computer-readable medium comprising computer readable code, that when executed by one or more processors, causes the one or more processors to perform operations comprising:

receiving topographical data between a first geographic location and a second geographic location;

determining a plurality of routes from the first geographic location to the second geographic location based on the topographical data, wherein each route of the plurality of routes is based upon a mode of transportation and is adjusted based on traffic data, weather data, or a combination thereof;

determining an energy efficiency value and the mode of transportation for each route of the plurality of routes;

receiving selection of at least one route of the plurality of routes; and invoking a transportation application in response to determining that a corresponding mode of transportation of the at least one route is associated with the transportation application.

17. The non-transitory computer-readable medium of claim 16, wherein invoking the transportation application comprises invoking a commercial taxi application based on the corresponding mode of transportation of the at least one route being associated with a taxi service.

18. The non-transitory computer-readable medium of claim 16, comprising displaying a plurality of route indicators corresponding to the plurality of routes from the first geographic location to the second geographic location.

19. The non-transitory computer-readable medium of claim 18, comprising:

in response to the selection of the at least one route, modifying a route indicator corresponding to the at least one route to be visually distinct from remaining route indicators of the plurality of route indicators.

20. The non-transitory computer-readable medium of claim 16, wherein the energy efficiency value is based on an energy consumption associated with a corresponding route and the mode of transportation for the corresponding route.

* * * * *